United States Patent
Maenpaa et al.

(10) Patent No.: US 10,041,967 B2
(45) Date of Patent: Aug. 7, 2018

(54) METHOD AND SYSTEM FOR ULTRASONIC AIRFLOW MEASUREMENTS

(71) Applicant: Accutron Instruments Inc., Sudbury (CA)

(72) Inventors: Douglas Leonard Maenpaa, Sudbury (CA); Robert Michael Sharkey, Sudbury (CA); Kenneth Richard Desormeaux, Sudbury (CA); Richard Edward Dignard, Sudbury (CA)

(73) Assignee: Accutron Instruments Inc., Sudbury, Ontario (CA)

( * ) Notice: Subject to any disclaimer, the term of this patent is extended or adjusted under 35 U.S.C. 154(b) by 209 days.

(21) Appl. No.: 15/185,274

(22) Filed: Jun. 17, 2016

(65) Prior Publication Data

US 2016/0370214 A1    Dec. 22, 2016

(30) Foreign Application Priority Data

Jun. 19, 2015  (CA) .................................. 2895361

(51) Int. Cl.
   *G01P 5/24*   (2006.01)
   *G01F 1/66*   (2006.01)

(52) U.S. Cl.
   CPC .............. *G01P 5/245* (2013.01); *G01F 1/662* (2013.01); *G01F 1/667* (2013.01)

(58) Field of Classification Search
   CPC .......... G01F 1/662; G01F 1/666; G01F 1/667; G01P 5/245

See application file for complete search history.

(56) References Cited

U.S. PATENT DOCUMENTS

| | | | | |
|---|---|---|---|---|
| 5,035,147 A | * | 7/1991 | Woodward | G01F 1/667 73/597 |
| 5,553,505 A | * | 9/1996 | Bignell | G01F 1/662 73/861.27 |
| 6,158,288 A | * | 12/2000 | Smith | G01F 1/667 73/861.18 |
| 6,604,433 B1 | * | 8/2003 | Azuma | G01F 1/662 73/861.27 |
| 6,644,129 B1 | * | 11/2003 | Shiba | G01F 1/662 73/861.27 |
| 6,796,189 B1 | * | 9/2004 | Umekage | G01F 1/66 73/861.27 |

(Continued)

*Primary Examiner* — Natalie Huls

(57) ABSTRACT

A method of determining a velocity of air flowing in an air flow direction through an opening. The method includes locating first and second transducer assemblies in the opening, to position the first and second transducer assemblies spaced apart by a predetermined distance along a substantially straight line of sight defining a non-zero angle in a horizontal plane between the line of sight and the air flow direction. A controller is operatively connected with the first and second transducer assemblies respectively, via a four-wire interface in which two of the wires are for power transmission and two of the wires are for transmitting signals. The transducer assemblies are time-synchronized. First and second electronic signal pulses are transmitted between the first and second transducer assemblies. Based on the transit times, the non-zero angle, and the predetermined distance, the velocity of the air flowing in the air flow direction is determined.

4 Claims, 5 Drawing Sheets

(56) References Cited

U.S. PATENT DOCUMENTS

| | | | | |
|---|---|---|---|---|
| 6,845,330 B2* | 1/2005 | Okuda | ................... | G01F 1/60 |
| | | | | 702/100 |
| 7,152,490 B1* | 12/2006 | Freund, Jr. | ............. | G01F 1/667 |
| | | | | 73/861.27 |
| 7,194,363 B2* | 3/2007 | Schaffer | ................. | G01F 1/667 |
| | | | | 340/870.39 |
| 2002/0011119 A1* | 1/2002 | Bignell | ................. | G01F 1/667 |
| | | | | 73/861.23 |
| 2002/0124662 A1* | 9/2002 | Suzuki | ................... | G01F 1/662 |
| | | | | 73/861.28 |
| 2005/0236932 A1* | 10/2005 | Nagahara | ............... | G01F 1/662 |
| | | | | 310/328 |
| 2007/0169536 A1* | 7/2007 | Cotton | .................. | G01F 1/667 |
| | | | | 73/1.16 |
| 2007/0169537 A1* | 7/2007 | Cotton | .................. | G01F 1/667 |
| | | | | 73/1.27 |
| 2012/0144930 A1* | 6/2012 | Aughton | .................. | E02B 7/26 |
| | | | | 73/861.28 |
| 2013/0167656 A1* | 7/2013 | Takemura | ............... | G01F 1/66 |
| | | | | 73/861.28 |
| 2015/0135850 A1* | 5/2015 | Gotou | ................... | G01F 1/667 |
| | | | | 73/861.28 |
| 2017/0131126 A1* | 5/2017 | Aughton | ................ | G01F 1/662 |
| 2017/0227354 A1* | 8/2017 | Maenpaa | ............... | G01B 17/00 |
| 2017/0227568 A1* | 8/2017 | Hies | ........................ | G01P 5/245 |

* cited by examiner

METHOD AND SYSTEM FOR ULTRASONIC AIRFLOW MEASUREMENTS

FIELD OF THE INVENTION

The present invention is a method and a system for ultrasonic airflow measurement in which pairs of transducer assemblies are time-synchronized respectively.

BACKGROUND OF THE INVENTION

Measuring a flow of air or of other fluids through an opening is necessary or desirable in various contexts, for various reasons. For example, in an underground mine, adequate ventilation is necessary for the health and safety of the workers, and this requires a sufficient flow of air.

In the prior art, the air flow may be determined or estimated in various ways, however, the known methods and systems are generally unsatisfactory.

SUMMARY OF THE INVENTION

For the foregoing reasons, there is a need for a method and a system for ultrasonic airflow measurements that overcomes or mitigates one or more of the disadvantages or defects of the prior art. Such disadvantages or defects are not necessarily included in those described above.

In its broad aspect, the invention provides a single controller connected to one or more pairs of ultrasonic transceivers (i.e., transducers) for airflow measurement in multiple locations. The system provides for accurate time synchronization of each measuring transducer pair, as well as the means for checking the accuracy of the time synchronization, and resynchronization of the transducer pairs as it becomes necessary to maintain accurate airflow readings. Time of flight measurements in each of the two directions takes place in the transducers themselves, and this information is digitally communicated to the single controller. Diagnostic functions are also provided. Cabling to establish powering and communications is implemented using a four-conductor cable, that may be shielded. Applications include industrial airflow measurement in ducting and air conduits, and airflow measurement for mining applications in tunnels and at mine fans.

BRIEF DESCRIPTION OF THE DRAWINGS

The invention will be better understood with reference to the attached drawings, in which.

DETAILED DESCRIPTION

Figure 1A:
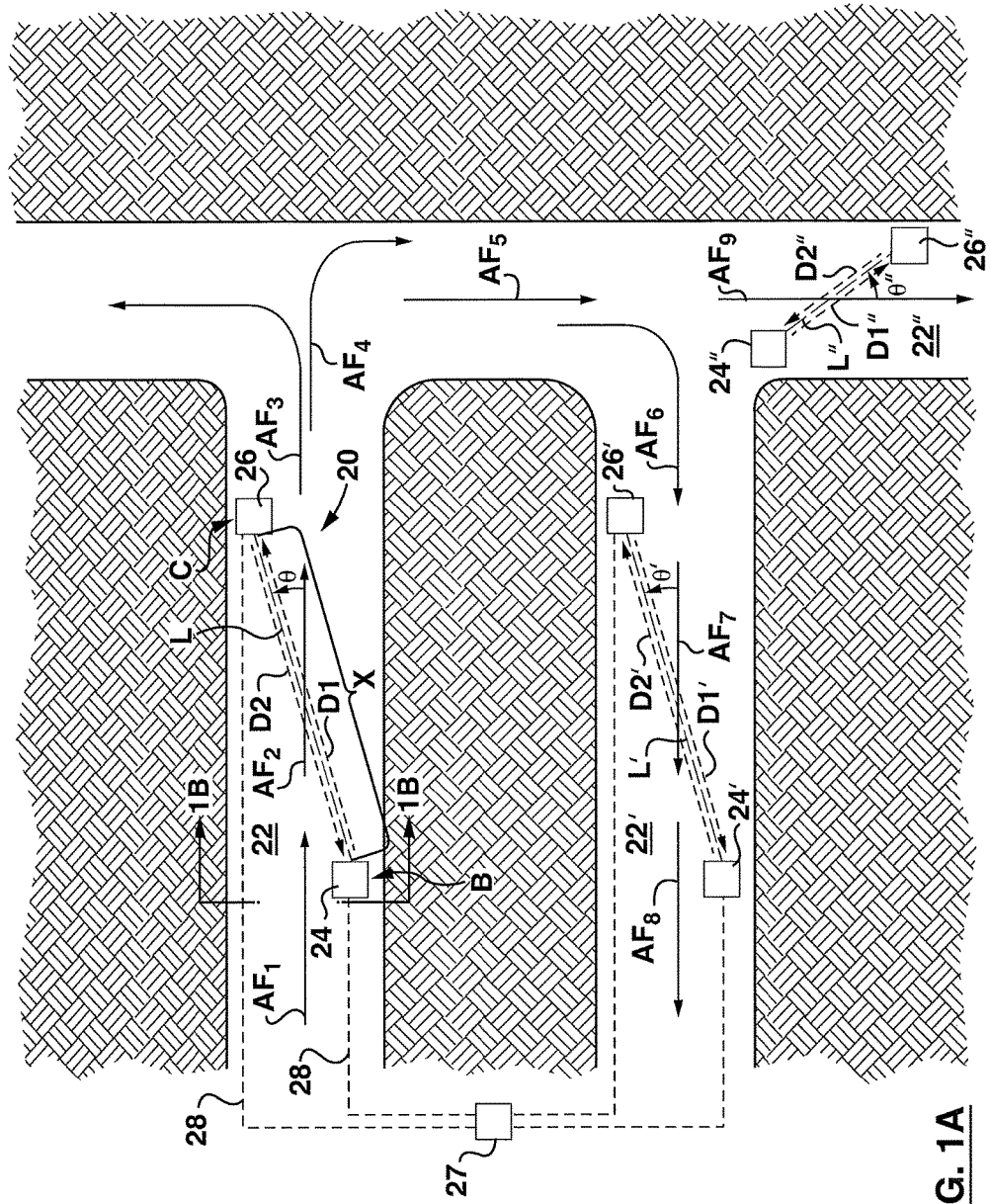
FIG. 1A is a top view of a number of drifts in underground workings with an embodiment of a system of the invention shown therein.
Figure 1B:
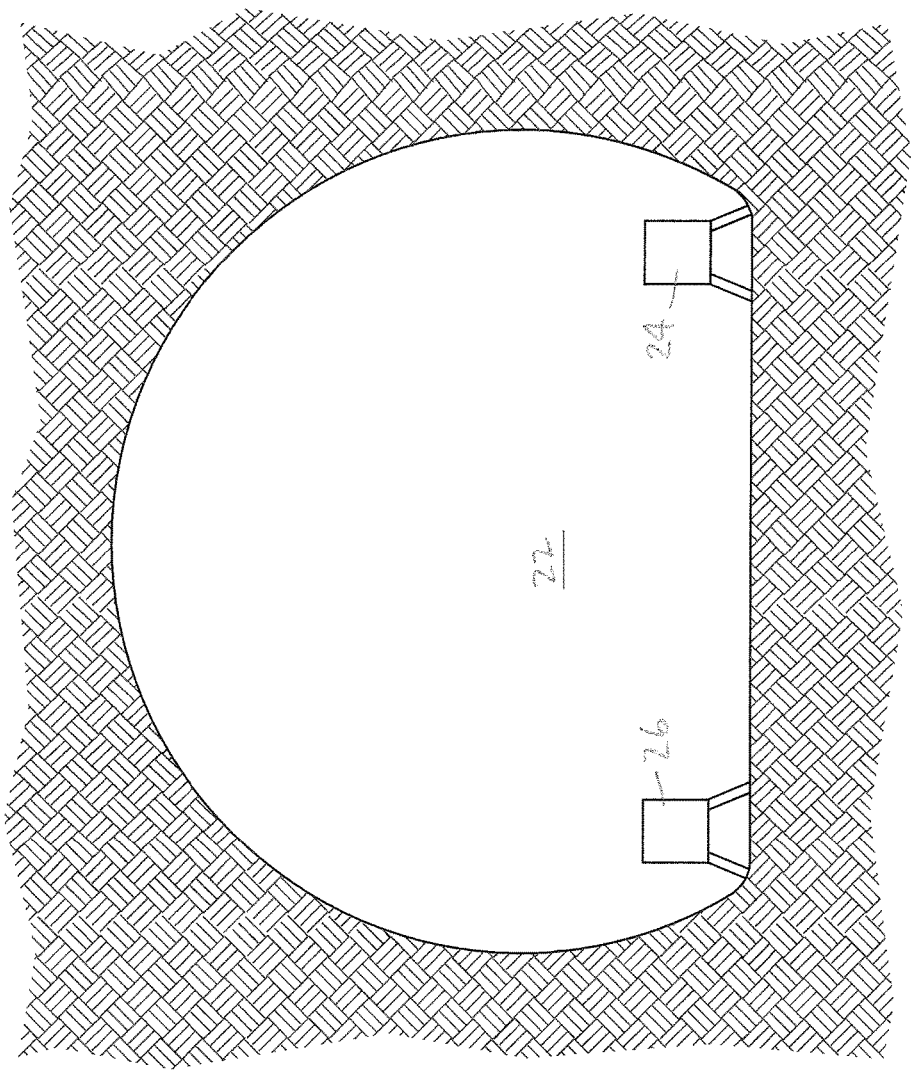
FIG. 1B is a cross-section taken along line "1B-1B" in FIG. 1A, drawn at a larger scale.
Figure 1C:
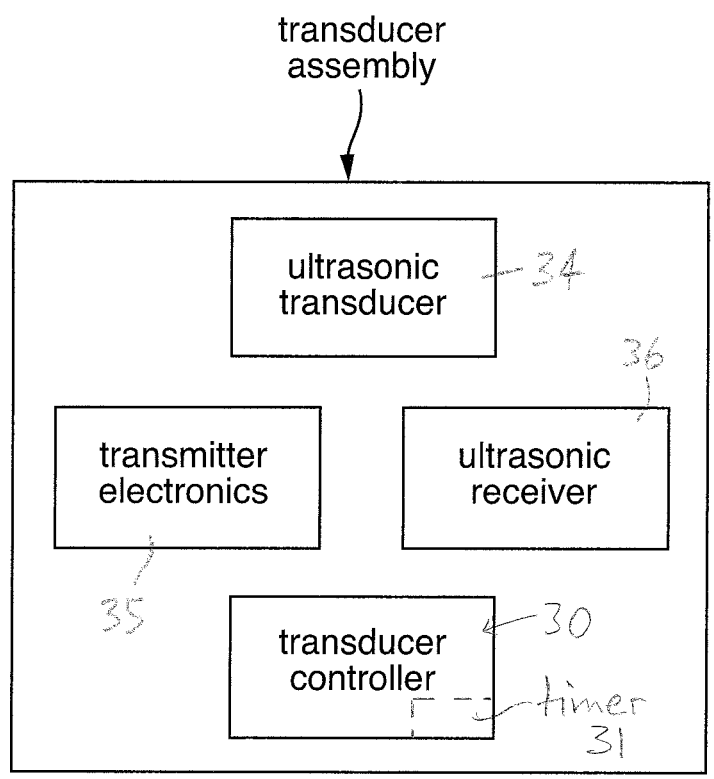
FIG. 1C is a schematic illustration of an embodiment of a transducer assembly.

In the attached drawings, like reference numerals designate corresponding elements throughout. Reference is first made to FIGS. 1A-1C to describe an embodiment of a system in accordance with the invention indicated generally by the numeral 20 (FIG. 1A). The system 20 is for determining a velocity of air flowing in an air flow direction through an opening 22 (FIG. 1A, 1B). In FIG. 1A, the direction of air flow is schematically represented by arrows $AF_1$-$AF_9$, as will be described. In one embodiment, the system 20 preferably includes a first transducer assembly 24 and a second transducer assembly 26, and a controller 27 operatively connected to the transducer assemblies 24, 26. As can be seen in FIG. 1A, the first transducer assembly 24 preferably is located at a first location (identified as "B" in FIG. 1A for convenience), and the second transducer assembly 26 is located at a second location (identified as "C" in FIG. 1A for convenience). The locations "B" and "C" are in the opening 22. Preferably, the first and second transducer assemblies 24, 26 are spaced apart by a predetermined distance, mounted diagonally to the air flow direction, as will be described. For instance, the first transducer assembly 24 and the second transducer assembly 26 are shown in FIG. 1A as being located spaced apart from each other by the predetermined distance, identified as "X" for clarity of illustration. The controller 27 may be connected with the transducer assemblies 24, 26 respectively in any suitable manner. The controller 27 preferably is operatively connected with the first and second transducer assemblies 24, 26 respectively via connecting wires or cables 28 (FIG. 1A). As can also be seen in FIG. 1A, the predetermined distance "X" is measured along a substantially straight line "L" between the faces of the first and second transducer assemblies 24, 26. It will be understood that the line "L" represents a line-of-sight between the two transducer assemblies 24, 26.

As will also be described, the first and second transducer assemblies 24, 26 are controllable by the controller 27 to transmit ultrasonic signals to each other.

The ultrasonic signal transmitted from the first transducer assembly 24 to the second transducer assembly 26 is schematically represented in FIG. 1A by arrow "D1", and the ultrasonic signal transmitted from the second transducer assembly 26 to the first transducer assembly 24 is schematically represented by arrow "D2". It will be understood that, for clarity of illustration, the arrows "D1" and "D2" are illustrated as being offset from the line of sight "L", and parallel to the line of sight "L". Those skilled in the art would appreciate that, in use, the ultrasonic signals schematically represented by the arrows "D1" and "D2" travel over the line of sight "L" and are coincident therewith, rather than as illustrated in FIG. 1A.

The transducer assemblies may be mounted at their respective locations in any suitable manner. An exemplary mounting arrangement is illustrated in FIG. 1B.

The first transducer assembly 24 is schematically illustrated in FIG. 1C. Preferably, the first transducer assembly 24 includes an ultrasonic transducer 34, transmitter electronics 35, a receiver 36, and a transducer controller 30 with one or more precision timers 31. In one embodiment, the precision timer 31 preferably is implemented via a microcontroller. The ultrasonic transducer may be, for example, a piezoelectric ceramic with a matching layer. It will be understood that the second transducer assembly 26 is the same in all material respects, i.e., the first and second transducer assemblies 24, 26 are electrically identical. This has the advantage that replacement of a particular transducer assembly is simplified. Examples of suitable transducer assemblies are the Accutron "B" and the Accutron "Plus" air flow sensors manufactured by Accutron Instruments Inc., 11

Mary Street, Unit B, Sudbury, Ontario, P3C 1B4, Canada for underground mining applications.

Preferably, the connecting cable 28 includes four conductors that may be shielded, for providing power and bidirectional differential communications. In one embodiment, the power is low voltage DC. Preferably, two conductors in the cable 28 provide positive and negative conductors for powering the transducer assemblies. The preferred standard for the differential communications is RS485, but other suitable standards known to those skilled in the art may be used alternatively.

The controller 27 preferably includes a suitable microcontroller and other components.

As noted above, the transducer assemblies preferably are deployed in pairs for each air flow measurement. In the system, each transducer assembly is addressable via a unique address that is transmitted serially over the cable 28. Various instruction commands may be sent to the transducer assemblies, to cause them to perform certain functions, such as diagnostic functions, in addition to other functions as described herein. In order for the transducers to measure transit time, each pair used for an air flow measurement preferably is time-synchronized. Preferably, time synchronization is accomplished by the controller addressing each transducer assembly pair simultaneously, or multiple transducer assembly pairs respectively.

The invention also includes an embodiment of a method of determining the velocity of the air flowing in the air flow direction through the opening 22. In one embodiment, the method preferably includes providing the first transducer assembly 24, and locating the first transducer assembly 24 at the first location "B" in the opening 22. Preferably, the method also includes providing the second transducer assembly 26, which includes the transducer controller 30, including the timer 31 (FIG. 1C). The first and second transducer assemblies are substantially electrically identical. It is also preferred that the second transducer assembly 26 is located at the second location "C" in the opening 22 so that the first and second transducer assemblies 24, 26 are intervisible relative to each other along the substantially straight line of sight "L". Preferably, the line of sight "L" defines a non-zero angle θ in a horizontal plane between the line of sight "L" and the air flow direction. The first and second transducer assemblies 24, 26 are positioned to be spaced apart by the predetermined distance "X". The controller 27 is operatively connected with the first and second transducer assemblies 24, 26, via a four-wire interface in which two of the four wires are for power transmission and two of the four wires are for signal transmission. With the controller, the first and second transducer assemblies are time-synchronized. Also, with the controller, the first and second transducer assemblies 24, 26 are simultaneously addressed, to cause the first transducer assembly 24 to transmit a first ultrasonic signal to the second transducer assembly 26, and to cause the timer 31 in the transducer controller 30 of the second transducer assembly 26 to commence timing at a first commencement time upon transmission of the first ultrasonic signal. Upon the first ultrasonic signal being received by the second transducer assembly 26, the timer 31 in the transducer controller 30 of the second transducer assembly 26 is stopped at a first terminal time. Next, a first time difference is determined by subtracting the first commencement time from the first terminal time.

In one embodiment, the method of the invention preferably additionally includes, with the controller, simultaneously addressing the first and second transducer assemblies 24, 26, to cause the second transducer assembly 26 to transmit a second ultrasonic signal to the first transducer assembly 24, and to cause the timer 31 of the transducer controller 30 of the first transducer assembly 24 to commence timing at a second commencement time upon transmission of the second ultrasonic signal. Upon the second ultrasonic signal being received by the first transducer assembly 24, the timer 31 of the transducer controller 30 of the first transducer assembly 24 is stopped at a second terminal time. A second time difference is determined by subtracting the second commencement time from the second terminal time. With the controller 27, based on the first and second time differences, the non-zero angle between the line of sight, the air flow direction, and the predetermined distance, the velocity of the air flowing in the air flow direction through the opening is determined.

The equation used to determine the air velocity is:

$$V_o = \cos\Theta \times \frac{X}{2} \times \frac{T1 - T2}{T1 \times T2}$$

where:
θ is the non-zero angle between the line of sight line "L" and the air flow direction;
X is the distance along the line of sight "L" between the first and second transducer assemblies;
T1 and T2 are the respective transit times of the ultrasonic pulses from the first to the second transducer assembly, and from the second to the first transducer assembly, respectively; and
$V_o$ is the average velocity of the air in the air flow direction.

The foregoing is only one example of the manner in which the time difference data obtained as described above may be utilized (i.e., processed). Those skilled in the art would appreciate that other equations may also be used to directly determine mass air flow, for example, from time difference information.

For example, in FIG. 1A, the direction of the air flow through the opening 22 is schematically represented by the arrows $AF_1$ and $AF_2$. The line of sight "L" defines the non-zero angle θ between such line and the direction of the air flow as represented by arrow $AF_2$.

As is known, the volumetric air flow (e.g., in cubic feet per minute, or cubic meters per hour) is determined by multiplying the average velocity and the cross-sectional area of the opening 22.

Various methods of time synchronization are known. For instance, time synchronization may be accomplished via a global synchronization message, transmitted differentially using RS485 communication to a pair of transducer assemblies, or to multiple transducer assembly pairs, as the case may be. In this method, upon receiving the synchronization message, each of the transducer assemblies 24, 26 enters a synchronization mode implemented in software. After entering synchronization mode, the synchronization reference signal is transmitted by the controller 27 to the transducer assemblies 24, 26. This signal or message may be, for example, a simple transition on the RS485 implemented by logic state transmitting. This transition is used to time-synchronize the pair of transducer assemblies 24, 26, so that accurate transit time measurements may be made in each transducer assembly of an associated pair.

From the foregoing, it can be seen that time transfer information (i.e., time synchronization) is communicated using differential signalling time synchronization. Time synchronization preferably takes place using the controller communication with multiple transducer assemblies simultaneously, using a synchronization sequence.

Between the transducer assemblies in each pair, a synchronization sequence is used. Multi-channel flow sensing takes place, using a single controller and preferably using multiple transducer pairs. Time-of-flight measurements take place in the transducer, which has been previously time-synchronized. As noted above, time synchronization of two flow-measuring transducer assemblies in each pair is required for accurate flow measurements.

The system of the invention can also check the time synchronization between a pair of flow-measuring transducers. This may be accomplished using the controller to interrogate each transducer in the pair to test the degree of time synchronization. If the time synchronization is not within acceptable limits, the controller can synchronize a given transducer pair. If the microprocessor/microcontroller in a given transducer assembly reboots for any reason, a provision is then made to signal the controller so that a time resynchronization is necessary.

Alternatively, the transducer assemblies in each pair may synchronize themselves by communicating with each other using RS485 communication, using techniques known to those skilled in the art.

As noted above, after time-transit measurements in each direction, the time transit information is transmitted to the controller 27, which determines the velocity and also the air flow. Such results may be displayed on a local or a remote display, or provide the results to a SCADA, or provide the results to a second interface built into the controller.

An alternative method of determining the velocity of the air flowing in the air flow direction through the opening includes providing the first transducer assembly 24, locating the first transducer assembly 24 at the first location "B" in the opening 22, providing the second transducer assembly 26, and locating the second transducer assembly 26 at the second location "C" in the opening 22. The first and second transducer assemblies are substantially electrically identical. The second transducer assembly 26 preferably is located to position the first and second transducer assemblies 24, 26 spaced apart by the predetermined distance so that the first and second transducer assemblies 24, 26 are intervisible relative to each other along the substantially straight line of sight "L". The line of sight "L" defines a non-zero angle in a horizontal plane between the line of sight and the air flow direction. The first and second transducer assemblies preferably are time-synchronized using differential signalling between the first and second transducer assemblies. The controller 27 is operatively connected with the first and second transducer assemblies 24, 26 respectively, via a four-wire interface in which two of the four wires are for power transmission and two of the four wires are for signal transmission. At a first transmission time, a first electronic signal pulse is transmitted from the first transducer assembly 24 to the second transducer assembly 26. At the second transducer assembly, the first electronic signal pulse is received at a first receipt time. The first transmission time and the first receipt time are transmitted to the controller 27.

Preferably, at a second transmission time, a second electronic signal pulse is transmitted from the second transducer assembly to the first transducer assembly. At the first transducer assembly, the second electronic signal pulse is received at a second receipt time. The second transmission time and the second receipt time are transmitted to the controller 27. With the controller, based on the first and second transmission times, the first and second receipt times, the non-zero angle, and the predetermined distance, the velocity of the air flowing in the air flow direction is determined.

Preferably, the first and second transducer assemblies 24, 26 are time-synchronized. It is also preferred that the first and second transducer assemblies 24, 26 are addressed simultaneously by the controller.

Those skilled in the art would appreciate that the time-synchronization of the first and second transducer assemblies may be accomplished using various techniques.

In this embodiment, the means of detecting the time transit is not limited to the use of individual ultrasonic pulses sent by the transmitting transducer assembly to the receiving transducer assembly of the pair. This alternative embodiment lends itself to the use of coded pulse sequences, such as an orthogonal sequence. Using coded pulse sequences, and appropriate signal processing in the receiving transducer assembly, it is possible to improve performance greatly, and especially in a high noise (i.e., acoustic and/or electrical) environment.

As can be seen in FIGS. 1A and 2-4, the system may include a number of pairs of transducer assemblies, located in different openings. Preferably, the pairs of transducer assemblies are operatively connected respectively to the controller 27. For instance, in FIG. 1A, first and second transducer assemblies 24' and 26' are shown located in another opening 22'. The transmission of the ultrasonic signals from the transducer assembly 24' to the other transducer assembly 26' is represented by Dr, and the ultrasonic transmission in the other direction is represented by D2'. The non-zero angle defined between the line L' and the arrow $AF_7$ is identified as θ'.

Similarly, the transducer assemblies 24", 26" are located in the opening 22". It will be understood that the transducer assemblies 24", 26" are operatively connected to the controller 27 by cables 28. (The cables 28 are omitted from FIG. 1A for clarity of illustration.) The non-zero angle defined between the line L" and the arrow $AF_9$ is identified as θ".

Preferably, where multiple pairs of transducer assemblies are utilized (e.g., as illustrated in FIG. 1A), the controller 27 sequentially addresses each pair of transducer assemblies, to obtain time transit information related to the airflow at each location respectively. Accordingly, in one embodiment, the single controller 27 preferably is connected to multiple pairs of transducer assemblies, for airflow measurement in multiple locations.

Figure 2:
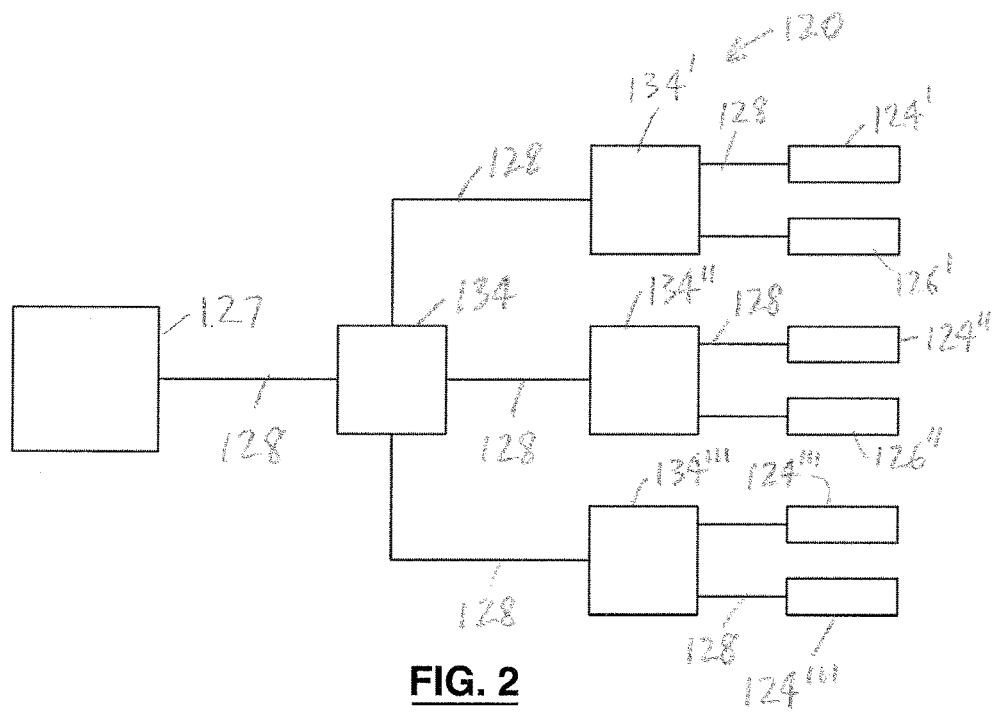
FIG. 2 is a block diagram illustrating an embodiment of a system of the invention.

It will be understood that the cable may be arranged to connect the pairs of transducer assemblies and the controller in various ways. For example, as illustrated in FIG. 2, junction boxes may be included in a system 120, to facilitate connection of additional pairs of transducer assemblies to the controller 27. The transducers 124', 126' are connected with the junction box 134' by cables 128, and the transducers 124", 126" are connected with the junction box 134" by cables 128. The transducers 124''', 126''' are connected with the junction box 134''' by cables 128. The junction boxes 134', 134", and 134''' are connected with the junction box 134 by additional cables 128.

Figure 3:
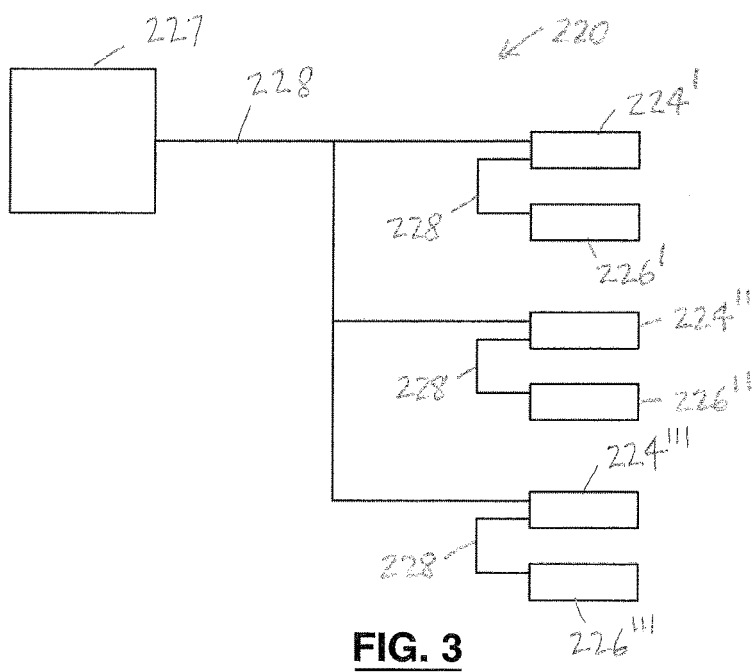
FIG. 3 is a block diagram illustrating an alternative embodiment of a system of the invention.
Figure 4:
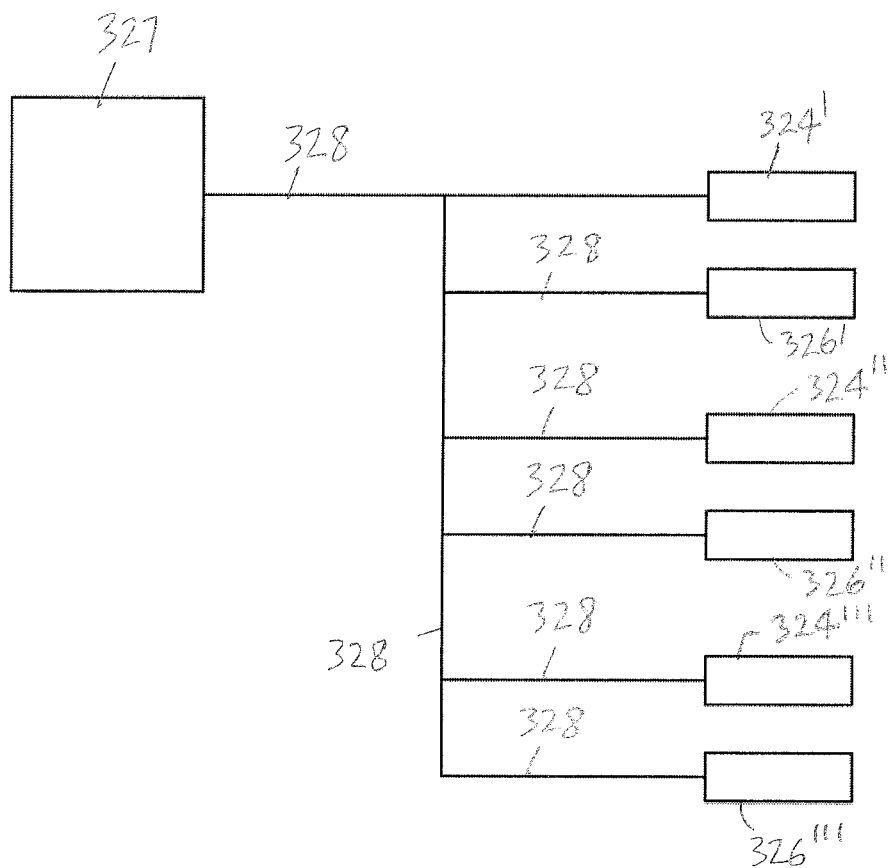
FIG. 4 is a block diagram illustrating an alternative embodiment of a system of the invention.

Alternative systems 220 and 320 are illustrated in FIGS. 3 and 4 respectively. As can be seen in FIG. 3, the system 220 includes a controller 227 that is connected to each pair of transducer assemblies by cables 228. Also, the transducer assemblies 224', 226' are connected directly to each other, as are the transducer assemblies 224", 226", and the transducer assemblies 224''', 226''', respectively.

Another arrangement is illustrated in FIG. 4. The system 320 includes a controller 327 connected by cables 328 with the transducer assemblies 324', 326'; 324", 326"; and 324'", 326'" respectively.

Those skilled in the art would appreciate that the data provided by the invention may be used to control different elements (e.g., fans, and doors) to change air flow as needed.

Although the embodiments of the invention are illustrated as being used in underground workings (and may be used to control the mine ventilation equipment accordingly), it will be understood that there are many other possible applications. For example, embodiments of the invention may be utilized in industrial airflow measurement inducting and air conduits.

It will be appreciated by those skilled in the art that the invention can take many forms, and that such forms are within the scope of the invention as claimed. The scope of the claims should not be limited by the preferred embodiments set forth in the examples, but should be given the broadest interpretation consistent with the description as a whole.

We claim:

1. A method of determining a velocity of air flowing in an air flow direction through an opening, the method comprising:
   (a) providing a first transducer assembly;
   (b) locating the first transducer assembly at a first location in the opening;
   (c) providing a second transducer assembly comprising a second transducer assembly timer, the first and second transducer assemblies being electrically identical;
   (d) locating the second transducer assembly at a second location in the opening such that the first and second transducer assemblies are intervisible relative to each other along a straight line of sight, the line of sight defining a non-zero angle in a horizontal plane between the line of sight and the air flow direction, to position the first and second transducer assemblies spaced apart by a predetermined distance;
   (e) operatively connecting a controller with the first and second transducer assemblies respectively, via a four-wire interface in which two of the wires are for power transmission and two of the wires are for transmitting signals;
   (f) with the controller, time-synchronizing the first and second transducer assemblies;
   (g) with the controller, simultaneously addressing the first and second transducer assemblies, to cause the first transducer assembly to transmit a first ultrasonic signal to the second transducer assembly, and to cause the second transducer assembly timer to commence timing at a first commencement time upon transmission of the first ultrasonic signal;
   (h) upon the first ultrasonic signal being received by the second transducer assembly, stopping the second transducer assembly timer at a first terminal time;
   (i) determining a first time difference by subtracting the first commencement time from the first terminal time;
   (j) with the controller, simultaneously addressing the first and second transducer assemblies, to cause the second transducer assembly to transmit a second ultrasonic signal to the first transducer assembly, and to cause a first transducer assembly timer of the first transducer assembly to commence timing at a second commencement time upon transmission of the second ultrasonic signal;
   (k) upon the second ultrasonic signal being received by the first transducer assembly, stopping the first transducer assembly timer at a second terminal time;
   (l) determining a second time difference by subtracting the second commencement time from the second terminal time; and
   (m) with the controller, based on the first and second time differences, the non-zero angle between the line of sight, the air flow direction, and the predetermined distance, determining the velocity of the air flowing in the air flow direction through the opening.

2. A method of determining a velocity of air flowing in an air flow direction through an opening, the method comprising:
   (a) providing a first transducer assembly;
   (b) locating the first transducer assembly at a first location in the opening;
   (c) providing a second transducer assembly, the first and second transducer assemblies being electrically identical;
   (d) locating the second transducer assembly at a second location in the opening, to position the first and second transducer assemblies spaced apart by a predetermined distance such that the first and second transducer assemblies are intervisible relative to each other along a straight line of sight, the line of sight defining a non-zero angle in a horizontal plane between the line of sight and the air flow direction;
   (e) operatively connecting a controller with the first and second transducer assemblies respectively, via a four-wire interface in which two of the wires are for power transmission and two of the wires are for transmitting signals;
   (f) time-synchronizing the first and second transducer assemblies, using differential signalling between the first and second transducer assemblies;
   (g) at a first transmission time, transmitting a first electronic signal pulse from the first transducer assembly to the second transducer assembly;
   (h) at the second transducer assembly, receiving the first electronic signal pulse at a first receipt time;
   (i) transmitting the first transmission time and the first receipt time to a controller;
   (j) at a second transmission time, transmitting a second electronic signal pulse from the second transducer assembly to the first transducer assembly;
   (k) at the first transducer assembly, receiving the second signal pulse at a second receipt time;
   (l) transmitting the second transmission time and the second receipt time to the controller; and
   (m) with the controller, based on the first and second transmission times, the first and second receipt times, the non-zero angle, and the predetermined distance, determining the velocity of the air flowing in the air flow direction.

3. A method according to claim 2 in which the first and second transducer assemblies are time-synchronized.

4. A method according to claim 3 in which the first and second transducer assemblies are addressed simultaneously by the controller.

* * * * *